(12) United States Patent
Willrich

(10) Patent No.: US 6,409,206 B1
(45) Date of Patent: Jun. 25, 2002

(54) FAN COOLED BABY STROLLER

(76) Inventor: Ronald E. Willrich, 6563 Channing Dr., North Highland, CA (US) 95660

( * ) Notice: Subject to any disclaimer, the term of this patent is extended or adjusted under 35 U.S.C. 154(b) by 0 days.

(21) Appl. No.: 09/397,256

(22) Filed: Sep. 16, 1999

(51) Int. Cl.$^7$ ............................................. B62B 1/00
(52) U.S. Cl. ............................ 280/658; 261/DIG. 3; 280/47.38; 297/184.13
(58) Field of Search ................. 261/DIG. 3, 28, 261/92; 297/184.13, 184.14; 62/261, 244, 245, 312, 314, 331, 531; 135/16, 33.7, 94, 96, 98; 280/647, 650, 658, 47.38

(56) References Cited

U.S. PATENT DOCUMENTS

| | | | |
|---|---|---|---|
| D99,964 S | | 6/1936 | Roemer |
| 2,247,028 A | * | 6/1941 | Kuntz ........................... 62/261 |
| 2,547,896 A | * | 4/1951 | Wellen ....................... 135/16 X |
| 2,646,843 A | | 7/1953 | Adler |
| 2,966,046 A | * | 12/1960 | Wright ...................... 62/314 X |
| 3,191,958 A | | 6/1965 | Smith |
| 3,548,415 A | * | 12/1970 | Waters ...................... 62/314 X |
| 3,776,217 A | | 12/1973 | Van Galen et al. |
| 3,834,680 A | * | 9/1974 | Yost et al. ...................... 261/92 |
| 3,963,382 A | | 6/1976 | Patton |
| 4,314,727 A | * | 2/1982 | Potts ...................... 297/184.13 |
| 5,349,975 A | | 9/1994 | Valdner |
| 5,560,219 A | * | 10/1996 | Vegara ....................... 62/245 X |
| 5,725,356 A | * | 3/1998 | Carter .......................... 416/240 |
| 6,027,137 A | * | 2/2000 | Rura .......................... 280/650 |

* cited by examiner

*Primary Examiner*—Michael Mar

(57) ABSTRACT

A fan cooled baby stroller for circulates air in the interior of a baby carriage to help keep an infant therein well ventilated and comfortable. The fan cooled baby stroller includes a bassinet with a canopy mounted over the bassinet. The canopy has a pair of side portions which each have a fan assembly mounted thereto. Each fan assembly comprises a housing, and a blower fan and motor disposed in the housing. The housings of the fan assemblies are extended through the associated side portion of the canopy. An outer side face of each housing faces outwards from the canopy from the associated side portion of the canopy. The outer side face of each housing has an inlet opening therein. A back face of each of the housings has an outlet opening therethrough inside the canopy.

11 Claims, 2 Drawing Sheets

FAN COOLED BABY STROLLER

BACKGROUND OF THE INVENTION

1. Field of the Invention

The present invention relates to baby carriages and strollers and more particularly pertains to a new fan cooled baby stroller for circulates air in the interior of a baby carriage to help keep an infant therein well ventilated and comfortable.

2. Description of the Prior Art

The use of baby carriages and strollers is known in the prior art. More specifically, baby carriages and strollers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,646,843—a protective cover for baby carriage contents by Alder; U.S. Pat. No. 3,963,382—a portable air circulating fan by Patton; U.S. Pat. No. 3,191,958—an adjustable and removable canopy for baby carriage by Smith; U.S. Pat. No. 3,776,217—a nursing box for babies or similar purposes by van Galen et al.; U.S. Pat. No. 5,349,975—an air cooled umbrella by Valdner; and U.S. Pat. No. Des. 99,964—an infant's play pad by Roemer.

While these devices fulfill their respective, particular objectives and requirements, the aforementioned patents do not disclose a new fan cooled baby stroller. The inventive device includes a bassinet with a canopy mounted over the bassinet. The canopy has a pair of side portions which each have a fan assembly mounted thereto. Each fan assembly comprises a housing, and a blower fan and motor disposed in the housing. The housings of the fan assemblies are extended through the associated side portion of the canopy. An outer side face of each housing faces outwards from the canopy from the associated side portion of the canopy. The outer side face of each housing has an inlet opening therein. A back face of each of the housings has an outlet opening therethrough inside the canopy.

In these respects, the fan cooled baby stroller according to the present invention substantially departs from the conventional concepts and designs of the prior art, and in so doing provides an apparatus primarily developed for the purpose of circulates air in the interior of a baby carriage to help keep an infant therein well ventilated and comfortable.

SUMMARY OF THE INVENTION

In view of the foregoing disadvantages inherent in the known types of baby carriages and strollers now present in the prior art, the present invention provides a new fan cooled baby stroller construction wherein the same can be utilized for circulates air in the interior of a baby carriage to help keep an infant therein well ventilated and comfortable.

The general purpose of the present invention, which will be described subsequently in greater detail, is to provide a new fan cooled baby stroller apparatus and method which has many of the advantages of the baby carriages and strollers mentioned heretofore and many novel features that result in a new fan cooled baby stroller which is not anticipated, rendered obvious, suggested, or even implied by any of the prior art baby carriages and strollers, either alone or in any combination thereof.

To attain this, the present invention generally comprises a bassinet with a canopy mounted over the bassinet. The canopy has a pair of side portions which each have a fan assembly mounted thereto. Each fan assembly comprises a housing, and a blower fan and motor disposed in the housing. The housings of the fan assemblies are extended through the associated side portion of the canopy. An outer side face of each housing faces outwards from the canopy from the associated side portion of the canopy. The outer side face of each housing has an inlet opening therein. A back face of each of the housings has an outlet opening therethrough inside the canopy.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fan cooled baby stroller apparatus and method which has many of the advantages of the baby carriages and strollers mentioned heretofore and many novel features that result in a new fan cooled baby stroller which is not anticipated, rendered obvious, suggested, or even implied by any of the prior art baby carriages and strollers, either alone or in any combination thereof.

It is another object of the present invention to provide a new fan cooled baby stroller which may be easily and efficiently manufactured and marketed.

It is a further object of the present invention to provide a new fan cooled baby stroller which is of a durable and reliable construction.

An even further object of the present invention is to provide a new fan cooled baby stroller which is susceptible of a low cost of manufacture with regard to both materials and labor, and which accordingly is then susceptible of low prices of sale to the consuming public, thereby making such fan cooled baby stroller economically available to the buying public.

Still yet another object of the present invention is to provide a new fan cooled baby stroller which provides in the apparatuses and methods of the prior art some of the advantages thereof, while simultaneously overcoming some of the disadvantages normally associated therewith.

Still another object of the present invention is to provide a new fan cooled baby stroller for circulates air in the interior of a baby carriage to help keep an infant therein well ventilated and comfortable.

Yet another object of the present invention is to provide a new fan cooled baby stroller which includes a bassinet with a canopy mounted over the bassinet. The canopy has a pair of side portions which each have a fan assembly mounted thereto. Each fan assembly comprises a housing, and a blower fan and motor disposed in the housing. The housings of the fan assemblies are extended through the associated side portion of the canopy. An outer side face of each housing faces outwards from the canopy from the associated side portion of the canopy. The outer side face of each housing has an inlet opening therein. A back face of each of the housings has an outlet opening therethrough inside the canopy.

Still yet another object of the present invention is to provide a new fan cooled baby stroller that may similarly be mounted to the canopy of a child's stroller to keep a child user ventilated and comfortable.

Even still another object of the present invention is to provide a new fan cooled baby stroller that helps prevent heat related injury and illness to infants when riding in a baby carriage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
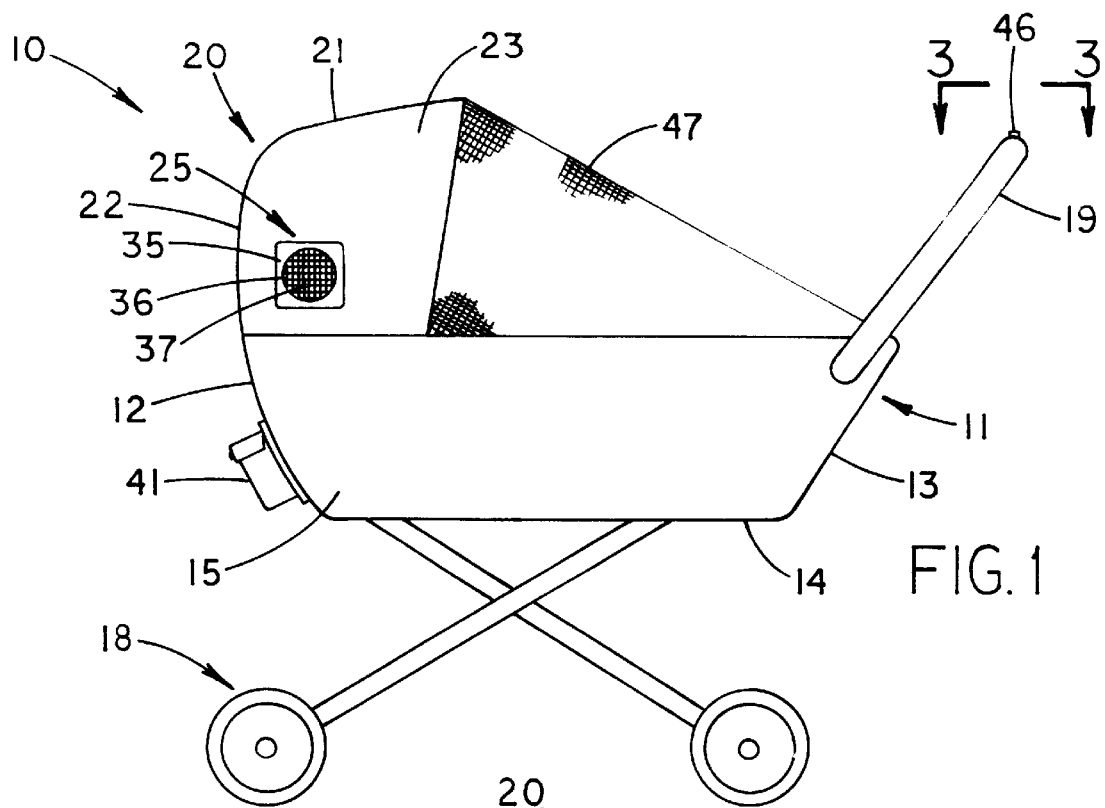
FIG. 1 is a schematic side view of the exterior of a new fan cooled baby stroller according to the present invention.

With reference now to the drawings, and in particular to FIGS. 1 through 5 thereof, a new fan cooled baby stroller embodying the principles and concepts of the present invention and generally designated by the reference numeral 10 will be described.

As best illustrated in FIGS. 1 through 5, the fan cooled baby stroller 10 generally comprises a bassinet with a canopy mounted over the bassinet. The canopy has a pair of side portions which each have a fan assembly mounted thereto. Each fan assembly comprises a housing, and a blower fan and motor disposed in the housing. The housings of the fan assemblies are extended through the associated side portion of the canopy. An outer side face of each housing faces outwards from the canopy from the associated side portion of the canopy. The outer side face of each housing has an inlet opening therein. A back face of each of the housings has an outlet opening therethrough inside the canopy.

Figure 2:
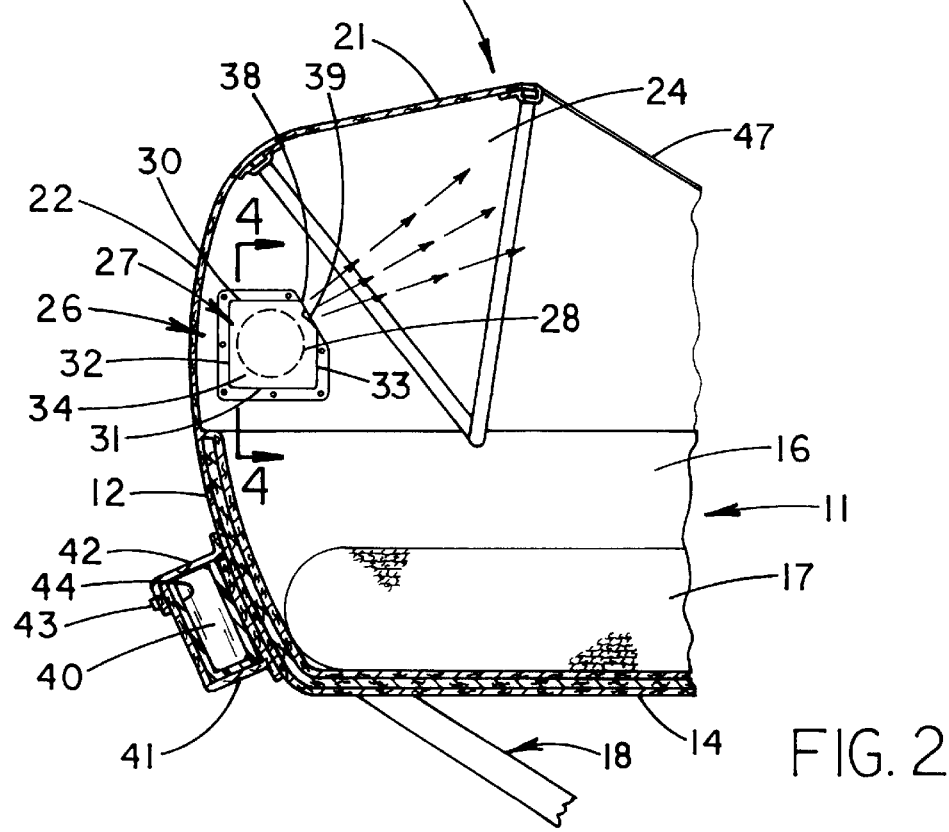
FIG. 2 is a schematic cross sectional view of a portion of the interior of the present invention.
Figure 3:
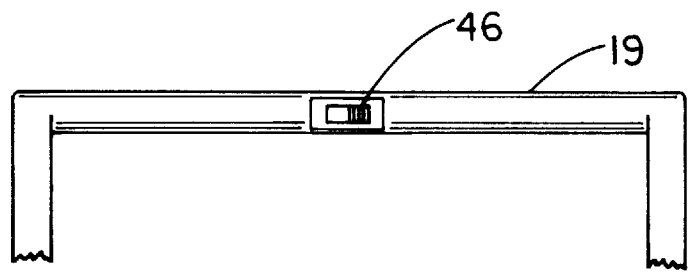
FIG. 3 is a schematic top view of the push handle of the present invention taken from the vantage of line 3—3 of FIG. 1.
Figure 4:
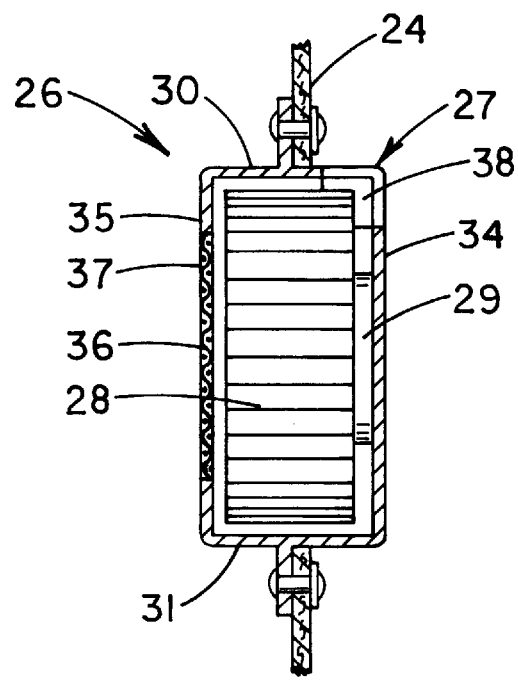
FIG. 4 is a schematic cross sectional view of a fan assembly of the present invention taken from line 4—4 of FIG. 2.
Figure 5:
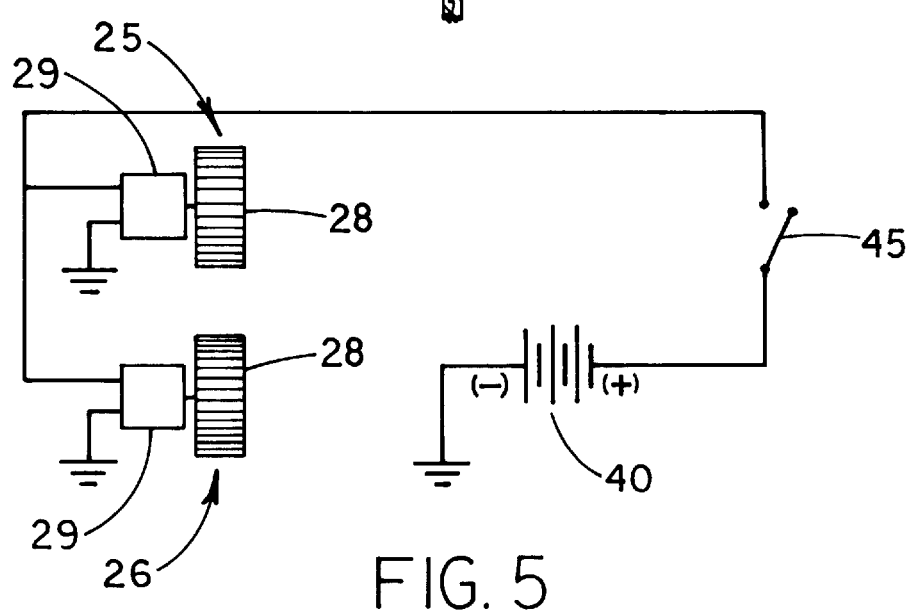
FIG. 5 is a schematic electrical diagram of the present invention.

In closer detail, the baby carriage 10 comprises a bassinet 11 for resting an infant user therein. The bassinet has a front 12, a back 13, a bottom 14, and a pair of sides 15,16, and an open top. Typically, the baby carriage has a bedding pad 17 therein for resting an infant thereon as illustrated in FIG. 2. The bassinet further includes a ground engaging wheel assembly 18 for supporting the bassinet above a ground surface and to permit traversing of bassinet across the ground surface with the wheel assembly. A push handle 19 extends from the back of the bassinet for permitting a user to push the bassinet across the ground surface.

A canopy 20 is mounted to the bassinet over the open top of the bassinet adjacent the front of the bassinet. The canopy has top 21, front 22 and a pair of side portions 23,24, and an open back facing towards the back of the bassinet. The top portion of the canopy is spaced above the open top of the bassinet. The front portion of the canopy is positioned adjacent the front of the bassinet. One of the side portions of the canopy is positioned adjacent one of the sides of the bassinet. The other of the side portions of the canopy is position adjacent the other of the sides of the bassinet.

Each of the side portions of the canopy has a fan assembly 25,26 mounted thereto. Each fan assembly comprises a housing 27, and a blower fan 28 and motor 29 for rotating the blower fan disposed in the housing. The housings of the fan assemblies are each extended through the associated side portion of the canopy.

The housings of the fan assemblies each have top and bottom faces 30,31, front and back faces 32,33, and inner and outer side faces 34,35. The inner side face of each housing faces inwards into the canopy from the associated side portion of the canopy. The outer side face of each housing faces outwards from the canopy from the associated side portion of the canopy.

The outer side face of each housing has an inlet opening 36 therein to permit passage of air therethrough into the housing. Preferably, each of the housings has a screen 37 (ideally a mesh screen) substantially covering the inlet opening of the respective housing to prevent objects greater than a predetermined size from passing through the inlet openings.

The back face of each housing faces towards the open back of the canopy. The back face of each of the housings has an outlet opening 38 therethrough to permit passage of air therethrough out of the housing. The outlet openings are positioned between the inner side face of the respective housing and the associated side portion of the canopy so that air is blown out the outlet openings only inside the canopy and not outside of the canopy. Preferably, the outlet openings each have a portion 39 extending into the inner side face of the respective housing to permit passage of air therethrough.

In use, rotation of the blower fans by the associated motor draws air into the housing through the inlet opening of the respective housing and forces air out of the outer opening of the respective housing into the area enclosed by the canopy to provide air circulation and ventilation to the enclosed area of the canopy and the bassinet.

A battery 40 is electrically connected to the motors of the fan assemblies for providing energy to the motors. Preferably, the battery is disposed in a pouch 41 located on the front of the bassinet. The pouch preferably has a cover flap 42 detachable attached thereto by a releasable fastener 43 for permitting opening of the cover flap to provide access to the battery in the pouch. Ideally, the batter is enclosed in a flexible and substantially water impermeable liner 44 in the pouch to prevent moisture such as from precipitation or humidity from reaching the battery and risk damaging the battery.

A switch 45 is electrically connected to the motors of the fan assemblies between the motors and the battery for permitting selective activation of the motors. The switch has an actuator 46 for actuating the switch. The actuator is preferably mounted on the push handle to permit a user pushing the baby carriage with the push handle.

In a preferred embodiment, a flexible cover 47 covers the back opening of the canopy and a back portion of the open top of the bassinet. The cover is detachably coupled to the canopy and the bassinet to prevent blowing off of the cover from covering the back portion of the open top of the bassinet. The cover preferably comprises a cloth material netting having a plurality of apertures therethrough to prevent passage of object greater than a predetermined size through the cover while still permitting air to pass through the cover. The cover also helps deflect air blown out of the fan assemblies back down towards the bassinet to keep the infant therein ventilated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A baby carriage, comprising:

a bassinet for resting an infant user therein and having an open top;

a canopy being mounted to said bassinet over said open top of said bassinet;

said canopy having a pair of side portions;

each of said side portions of said canopy having a fan assembly mounted thereto;

each fan assembly comprising a housing, and a blower fan and motor for rotating said blower fan disposed in said housing;

said housings of said fan assemblies being extended through the associated side portion of said canopy;

said housings of said fan assemblies each having a back face, and inner and outer side faces;

said inner side face of each housing facing inwards into said canopy from the associated side portion of said canopy;

said outer side face of each housing facing outwards from said canopy from the associated side portion of said canopy;

said outer side face of each housing having an inlet opening therein;

said back face of each of said housings having an outlet opening therethrough; and wherein said outlet openings each have a portion extending into said inner side face of the respective housing, said outlet openings each directing air flow generated by said blower fan along an interior face of an associated one of said side portions of said canopy for directing the air flow in a path away from a face of an infant in said bassinet.

2. The baby carriage of claim 1, wherein each of said housings has a screen substantially covering said inlet opening of the respective housing.

3. The baby carriage of claim 1, wherein a battery is electrically connected to said motors of said fan assemblies.

4. The baby carriage of claim 3, wherein said battery is disposed in a pouch on said bassinet.

5. The baby carriage of claim 4, wherein said pouch has a cover flap detachable attached thereto, and wherein said battery is enclosed in a flexible and substantially water impermeable liner in said pouch.

6. The baby carriage of claim 1, further comprising a switch being electrically connected to said motors of said fan assemblies.

7. The baby carriage of claim 6, wherein said bassinet has a push handle, and wherein said switch has an actuator mounted on said push handle.

8. The baby carriage of claim 1, wherein said outlet openings are positioned such that the air flow is directed towards said top portion of said canopy.

9. The baby carriage of claim 1, wherein said outlet openings are positioned such that the air flow is directed towards an opening in said canopy facing a back of said bassinet for drawing air in said canopy out of said canopy.

10. The baby carriage of claim 1, wherein said outlet openings are positioned such that the air flow is directed upward and rearward from said fan assembly.

11. A baby carriage, comprising:

a bassinet for resting an infant user therein and having a front, a back, a bottom, and a pair of sides, and an open top;

said bassinet having a ground engaging wheel assembly for supporting said bassinet above a ground surface and to permit traversing of bassinet across said ground surface with said wheel assembly;

said bassinet having a push handle extending from said back of said bassinet for permitting a user to push said bassinet across the ground surface;

a canopy being mounted to said bassinet over said open top of said bassinet adjacent said front of said bassinet;

said canopy having top, front and a pair of side portions, and an open back facing towards said back of said bassinet portion;

said top portion of said canopy being spaced above said open top of said bassinet;

said front portion of said canopy being positioned adjacent said front of said bassinet;

one of said side portions of said canopy being positioned adjacent one of said sides of said bassinet, the other of said side portions of said canopy being position adjacent the other of said sides of said bassinet;

each of said side portions of said canopy having a fan assembly mounted thereto;

each fan assembly comprising a housing, and a blower fan and motor for rotating said blower fan disposed in said housing;

said housings of said fan assemblies being extended through the associated side portion of said canopy;

said housings of said fan assemblies each having top and bottom faces, front and back faces, and inner and outer side faces;

said inner side face of each housing facing inwards into said canopy from the associated side portion of said canopy;

said outer side face of each housing facing outwards from said canopy from the associated side portion of said canopy;

said outer side face of each housing having an inlet opening therein to permit passage of air therethrough into said housing;

each of said housings having a screen substantially covering said inlet opening of the respective housing for preventing objects greater than a predetermined size from passing through said inlet openings;

said back face of each housing facing towards said open back of said canopy;

said back face of each of said housings having an outlet opening therethrough to permit passage of air therethrough out of said housing, said outlet openings being positioned between said inner side face of the respective housing and the associated side portion of said canopy;

wherein said outlet openings each have a portion extending into said inner side face of the respective housing to permit passage of air therethrough, said outlet openings each directing air flow generated by said blower fan along an interior face of an associated one of said side portions of said canopy for directing the air flow in a path away from a face of an infant in said bassinet;

wherein rotation of said blower fans by the associated motor draws air into said housing through said inlet opening of the respective housing and forces air out of said outer opening of the respective housing;

a battery being electrically connected to said motors of said fan assemblies into the area enclosed by said head canopy to provide air circulation and ventilation to said enclosed area of said head canopy and said bassinet, said outlet openings being for directing air flow generated by said blower fan along an interior face of each of said side portions of said head canopy such that the air flow is blown away from a face of the infant in said bassinet;

said battery being disposed in a pouch located on said front of said bassinet, said pouch having a cover flap detachable attached thereto by a releasable fastener for permitting opening of said cover flap to provide access to said battery in said pouch;

said battery being enclosed in a flexible and substantially water impermeable liner in said pouch to prevent moisture from reaching said battery;

a switch being electrically connected to said motors of said fan assemblies;

said switch having an actuator for actuating said switch, said actuator being mounted on said push handle to permit the user pushing said bassinet with said push handle to actuate said switch;

a flexible cover covering said back opening of said canopy and a back portion of said open top of said bassinet, said cover being coupled to said canopy and said bassinet to prevent blowing off of said cover from covering said back portion of said open top of said bassinet; and said cover comprising a cloth material netting having a plurality of apertures therethrough for preventing passage of objects greater than a predetermined size through said cover while permitting air to pass through said cover, said cover also helping deflect air flow from said fan assemblies back down towards said bassinet to keep the infant ventilated.

\* \* \* \* \*